US010594937B2

(12) United States Patent
Harris et al.

(10) Patent No.: US 10,594,937 B2
(45) Date of Patent: *Mar. 17, 2020

(54) MULTI-SENSOR IMAGE STABILIZATION TECHNIQUES

(71) Applicant: Amazon Technologies, Inc., Seattle, WA (US)

(72) Inventors: Scott Raymond Harris, Bainbridge Island, WA (US); Ishay Kamon, Redmond, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,448

(22) Filed: Dec. 22, 2018

(65) Prior Publication Data
US 2019/0149735 A1 May 16, 2019

Related U.S. Application Data

(63) Continuation of application No. 15/177,194, filed on Jun. 8, 2016, now Pat. No. 10,212,346.

(51) Int. Cl.
*H04N 5/232* (2006.01)
*G06K 9/00* (2006.01)
(Continued)

(52) U.S. Cl.
CPC ....... *H04N 5/23248* (2013.01); *G06K 9/0063* (2013.01); *H04N 5/2258* (2013.01);
(Continued)

(58) Field of Classification Search
CPC .............. G06K 9/0063; H04N 5/2258; H04N 5/23248; H04N 5/23254; H04N 5/23258; H04N 5/23287; H04N 5/247
See application file for complete search history.

(56) References Cited

U.S. PATENT DOCUMENTS 5,798,786 A * 8/1998 Lareau .................. G01C 11/02
348/144
6,100,925 A * 8/2000 Rosser .................. G01S 3/7864
348/169
(Continued)

FOREIGN PATENT DOCUMENTS

CN 101257581 A 9/2008
EP 2400460 A1 12/2011
(Continued)

OTHER PUBLICATIONS

International Search Report and Written Opinion for PCT/US2017/036019, dated Apr. 13, 2018.
(Continued)

*Primary Examiner* — Amy R Hsu
(74) *Attorney, Agent, or Firm* — Athorus, PLLC

(57) ABSTRACT

An aerial vehicle may include a first sensor, such as a digital camera, having a lens or other component that includes a second sensor mounted thereto. Information or data, such as digital images, captured using the second sensor may be used to determine or predict motion of the lens, which may include components of translational and/or rotational motion. Once the motion of the lens has been determined or predicted, such motion may be used to stabilize information or data, such as digital images, captured using the first sensor, according to optical or digital stabilization techniques. Where operations of the first sensor and the second sensor are synchronized, motion of the second sensor may be modeled based on information or data captured thereby, and imputed to the first sensor.

20 Claims, 11 Drawing Sheets

(51) Int. Cl.
*H04N 5/225* (2006.01)
*H04N 5/247* (2006.01)

(52) U.S. Cl.
CPC ..... *H04N 5/23254* (2013.01); *H04N 5/23258* (2013.01); *H04N 5/23287* (2013.01); *H04N 5/247* (2013.01)

(56) References Cited

U.S. PATENT DOCUMENTS

| | | | | |
|---|---|---|---|---|
| 9,797,728 | B2* | 10/2017 | Eline | B64C 39/024 |
| 2005/0047672 | A1* | 3/2005 | Ben-Ezra | H04N 5/2258 |
| | | | | 382/255 |
| 2009/0002501 | A1* | 1/2009 | Silsby | G11B 31/006 |
| | | | | 348/208.16 |
| 2009/0244298 | A1* | 10/2009 | Liu | H04N 5/144 |
| | | | | 348/208.4 |
| 2011/0311099 | A1 | 12/2011 | Derbanne | |
| 2013/0176423 | A1* | 7/2013 | Rischmuller | G05D 1/0038 |
| | | | | 348/114 |
| 2016/0137311 | A1* | 5/2016 | Peverill | B64C 39/024 |
| | | | | 244/110 C |
| 2016/0301836 | A1* | 10/2016 | Hjelmstrom | H04N 5/2253 |
| 2016/0341554 | A1* | 11/2016 | Hillier | G01C 11/02 |
| 2016/0381346 | A1* | 12/2016 | Hsu | H04N 5/2257 |
| | | | | 348/47 |
| 2017/0150053 | A1* | 5/2017 | Eline | B64C 39/024 |

FOREIGN PATENT DOCUMENTS

| | | |
|---|---|---|
| EP | 3171589 A1 | 5/2017 |
| JP | H11146261 A | 5/1999 |
| JP | H11155096 A | 6/1999 |
| JP | 2007049478 A | 2/2007 |
| JP | 2010210486 A | 9/2010 |
| JP | 2012090216 A | 5/2012 |
| JP | 2013139256 A | 7/2013 |
| WO | 2006043315 A1 | 4/2006 |

OTHER PUBLICATIONS

Search Report dated Jul. 25, 2019, for corresponding CN Application No. 201780036303.0.

* cited by examiner

MULTI-SENSOR IMAGE STABILIZATION TECHNIQUES

CROSS-REFERENCE TO RELATED APPLICATIONS

This application is a continuation of U.S. patent application Ser. No. 15/177,194, filed Jun. 8, 2016, now U.S. Pat. No. 10,212,346, the contents of which are incorporated by reference herein in their entirety.

BACKGROUND

The use of imaging devices or other sensors during in-flight operations of aerial vehicles is increasingly common. In particular, unmanned aerial vehicles, or UAVs, are frequently equipped with one or more imaging devices such as digital cameras, range cameras, depth sensors, infrared sensors or other systems that may detect, capture and/or process visible or invisible light. Where an aerial vehicle is equipped with one or more imaging devices, such devices may be utilized in any number of operations or applications of the aerial vehicle, and for any purpose. For example, an imaging device may be used to capture imaging data such as still or moving images and any associated audio signals or metadata (e.g., geotags or date or time stamps) to aid in the safe operation of an aerial vehicle, such as for maneuvering or control, including but not limited to collision avoidance. Alternatively, an imaging device carried aboard an aerial vehicle may be used in surveillance or monitoring applications, such as when the aerial vehicle is utilized to photograph large or diverse areas, or areas from angles that cannot readily be accessed by grounded photographers or ground-based photographic equipment.

During airborne operations, an aerial vehicle is commonly subjected to a variety of forces of different natures and degrees. For example, an aerial vehicle may be subjected to forces generated by air flowing above, below and around the aerial vehicle in flight, including forces of thrust, lift, shear or drag. Additionally, an aerial vehicle may also be subjected to noise or vibrations of varying intensities or in varying frequency spectrums, e.g., due to rotating motors or other machinery onboard the aerial vehicle, or due to one or more aspects of the aerial vehicle that may resonate or oscillate during flight. An aerial vehicle may further be subjected to forces resulting from impacts with various airborne or ground-based objects.

When an aerial vehicle is subjected to such forces during flight, the quality of imaging data captured by any imaging devices operating thereon may be affected thereby. Ordinarily, when an imaging device captures imaging data while the imaging device is in motion, the imaging data may be stabilized or corrected according to one or more physical or digital processing techniques. Such techniques are inherently complicated where an imaging device is carried aboard an aerial vehicle in flight, however, particularly where a field of view of the imaging device does not include a fixed reference point on which stabilization of imaging data captured by the imaging device may be based.

DETAILED DESCRIPTION

As is set forth in greater detail below, the present disclosure is directed to image stabilization techniques that utilize multiple sensors to modify one or more images, or to stabilize a series of the images captured using one of the sensors. More specifically, the systems and methods of the present disclosure are directed to imaging devices, such as digital cameras, having lenses, lens modules or other optical components with imaging devices or other sensors mounted on one or more external surfaces thereof. For example, in one embodiment, an aerial vehicle may be equipped with a primary (e.g., substantially forward-oriented) imaging device having a lens or a lens module and a secondary (e.g., substantially downward-oriented) imaging device or other sensor mounted on an underside thereof. In accordance with one or more embodiments of the present disclosure, the primary imaging device and the secondary imaging device may be configured to capture imaging data simultaneously. During normal operation, the secondary imaging device is operated to capture imaging data regarding ground terrain over which the aerial vehicle travels, within a field of view of the secondary imaging device extending below the aerial vehicle. Simultaneously, the primary imaging device may be operated in synchronicity with the secondary imaging device to capture imaging data within a field of view extending forward of the aerial vehicle. The field of view of the primary imaging device may include one or more structures, obstructions, hazards, animals, other aerial vehicles, or one or more other objects.

In some embodiments, imaging data captured by a secondary imaging device that includes or describes features of ground terrain below the aerial vehicle may be processed in real time or in near-real time, in order to determine a function, a vector or another metric representative of translational and/or rotational motion of a primary imaging device to which the secondary imaging device is joined. Using such a function, vector or metric, the imaging data captured by the primary imaging device may be modified accordingly to stabilize the imaging data on account of the translational and/or rotational motion of the aerial vehicle, which was itself determined using imaging data captured by the secondary imaging device.

Figure 1A:
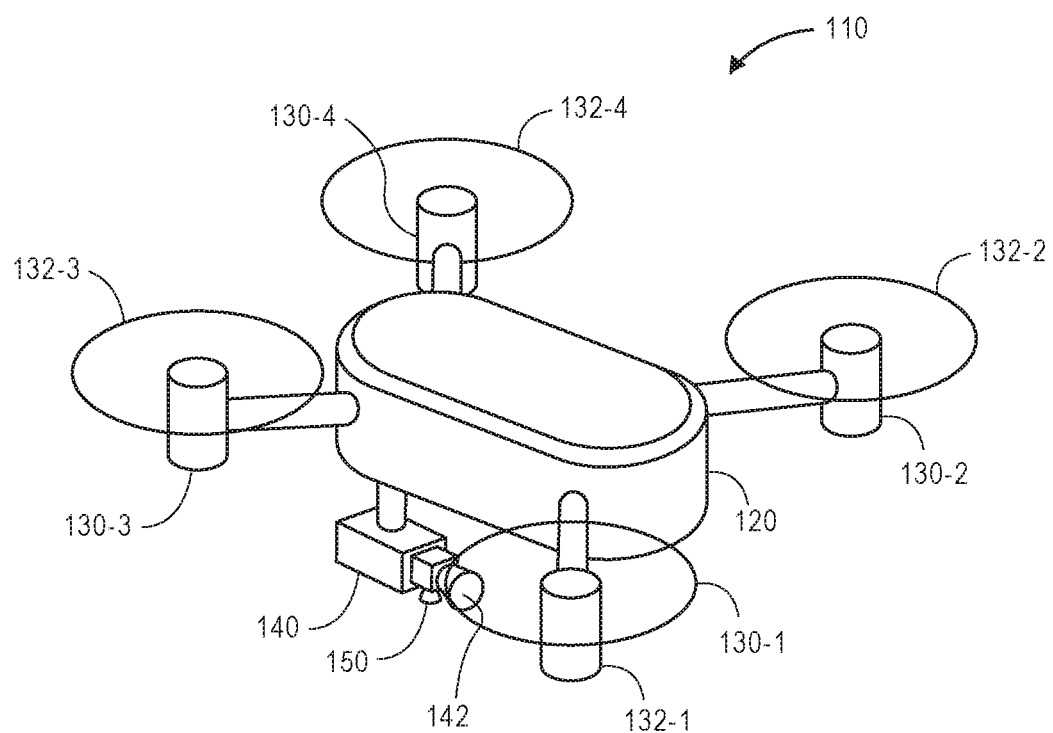
FIGS. 1A through 1E are views of aspects of one aerial vehicle configured to perform multi-sensor image stabilization techniques in accordance with embodiments of the present disclosure.
Figure 1B:
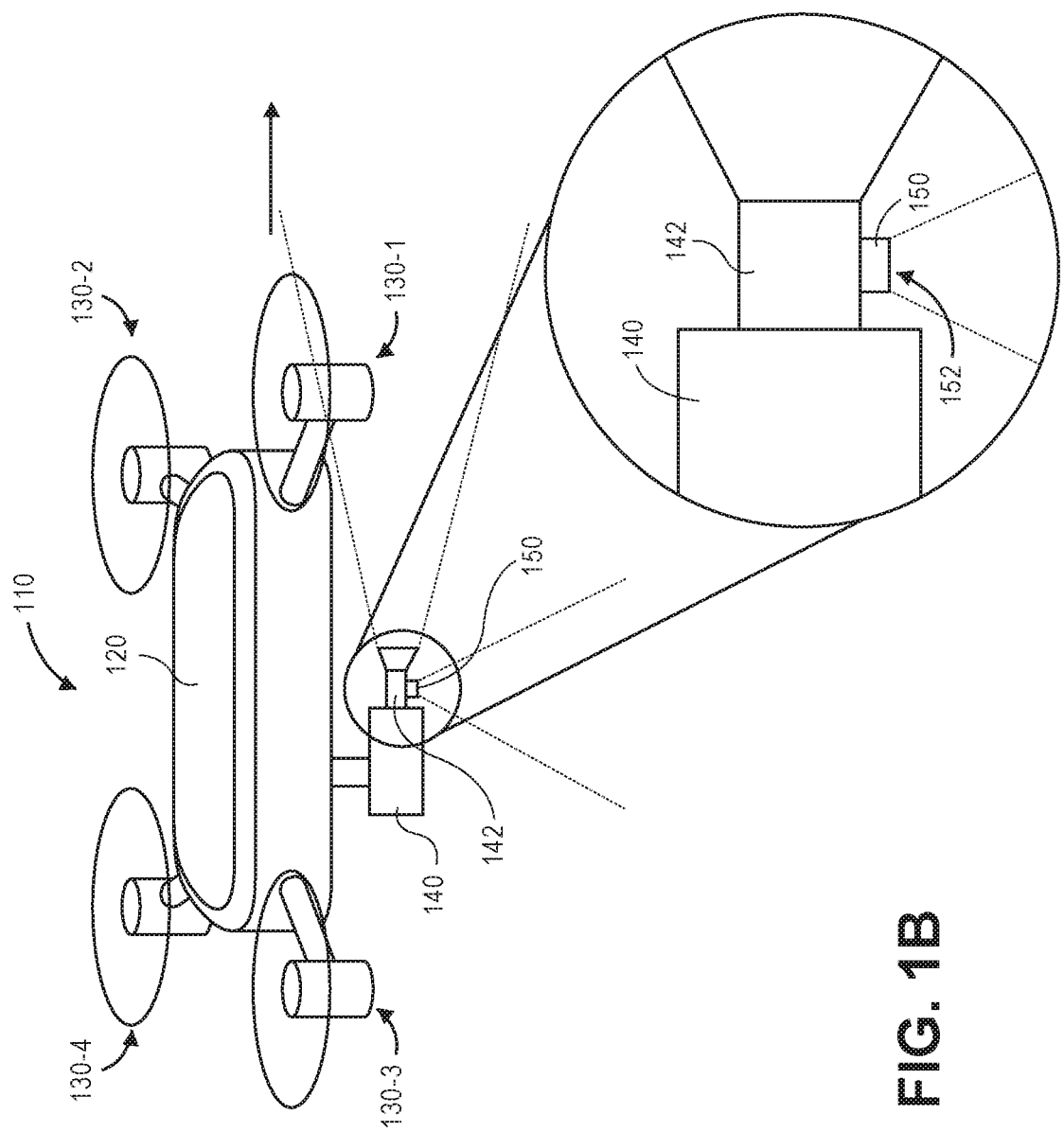

Referring to FIGS. 1A through 1E, an aerial vehicle 110 configured to perform multi-sensor image stabilization techniques is shown. FIG. 1A is a perspective view of the aerial vehicle 110 in flight, and FIG. 1B is a side view of the aerial vehicle 110 in flight. As is shown in FIGS. 1A and 1B, the aerial vehicle 110 includes a frame 120 having a plurality of motors 130-1, 130-2, 130-3, 130-4 and a primary imaging device 140 mounted thereto. The motors 130-1, 130-2, 130-3, 130-4 are coupled to propellers 132-1, 132-2, 132-3, 132-4, each of which is configured to rotate about an axis that is substantially vertical with respect to the frame 120 under power, thereby generating forces of lift on the aerial vehicle 110 during operation. The primary imaging device 140 includes a lens (or lens module) 142 having a secondary imaging device 150 mounted thereto, e.g., on an underside of the lens 142. As is shown in FIG. 1B, the lens 142 of the primary imaging device 140 is aligned in a substantially forward direction with respect to the frame 120, while a lens (or lens module) 152 of the secondary imaging device 150 is aligned in a substantially downward direction with respect to the frame 120.

Figure 1C:
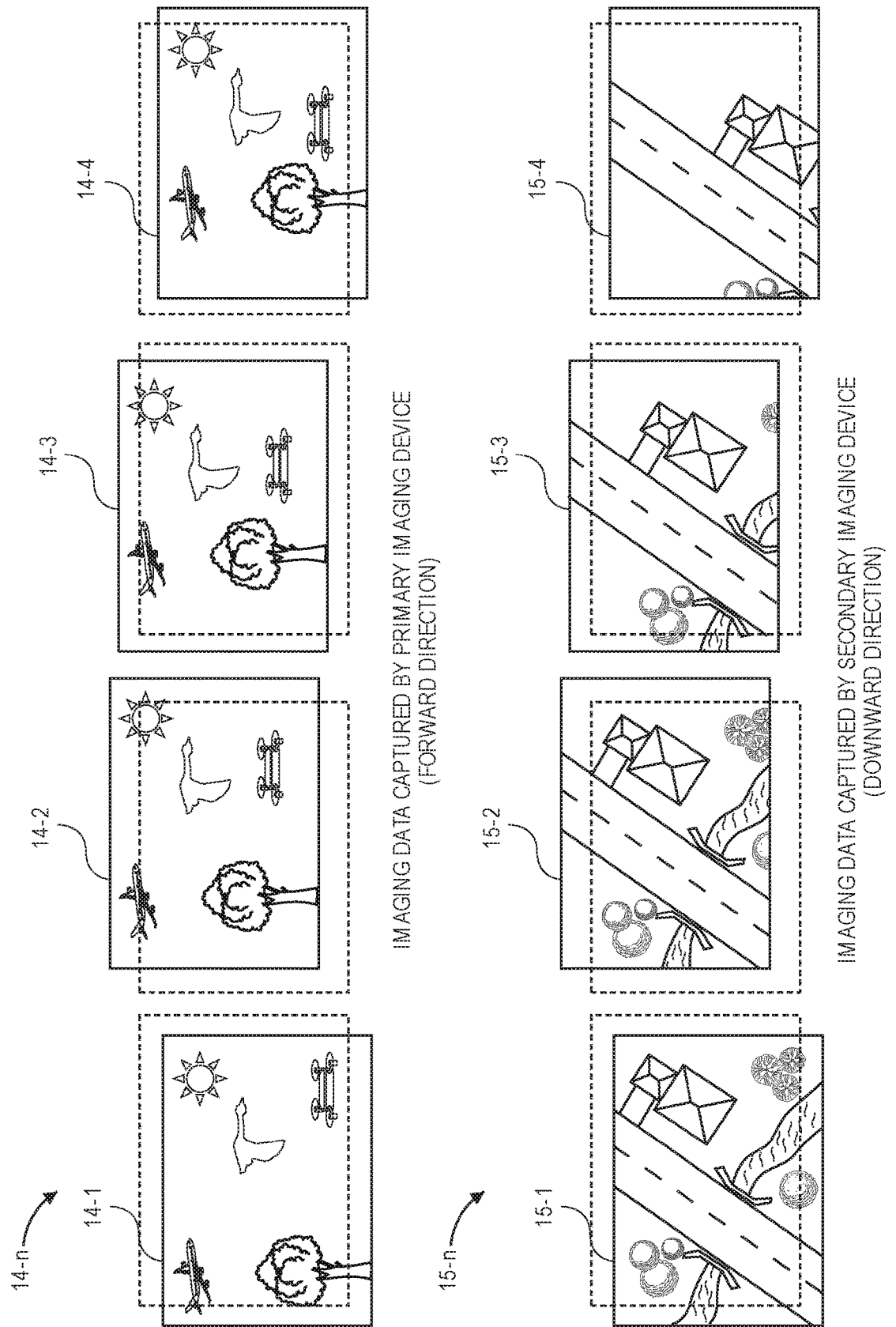

Referring to FIG. 1C, imaging data is captured simultaneously by the primary imaging device 140 and the secondary imaging device 150, respectively. The primary imaging device 140 captures primary imaging data 14-$n$ comprising a sequence of primary images 14-1, 14-2, 14-3, 14-4 from a forward direction of the aerial vehicle 110 and the secondary imaging device 150 captures secondary imaging data 15-$n$ comprising a sequence of secondary images 15-1, 15-2, 15-3, 15-4 captured from a downward direction of the aerial vehicle 110. As is shown in FIG. 1C, each of the primary images 14-1, 14-2, 14-3, 14-4 in the sequence 14-$n$ is sharply focused, yet is improperly aligned with respect to one another, e.g., due to vibration or other motion of the aerial vehicle 110 during operation. Likewise, each of the secondary images 15-1, 15-2, 15-3, 15-4 in the sequence 15-$n$ is sharply focused, yet is also improperly aligned with respect to one another.

In accordance with the present disclosure, imaging data captured using a first sensor may be stabilized using information or data captured using a second sensor that is physically joined to one or more portions of the first sensor. For example, because the secondary imaging device 150 of FIG. 1A and FIG. 1B is mounted to the lens 142 of the primary imaging device 140, any translational and/or rotational motion experienced by the secondary imaging device 150 during the capture of the secondary imaging data 15-$n$ is the same as translational and/or rotational motion experienced by the primary imaging device 140 during the capture of the primary imaging data 14-$n$. Where motion of the second sensor may be modeled using information or data captured thereby, imaging data captured by the first sensor may be adjusted based on the modeled motion of the second sensor.

Figure 1D:
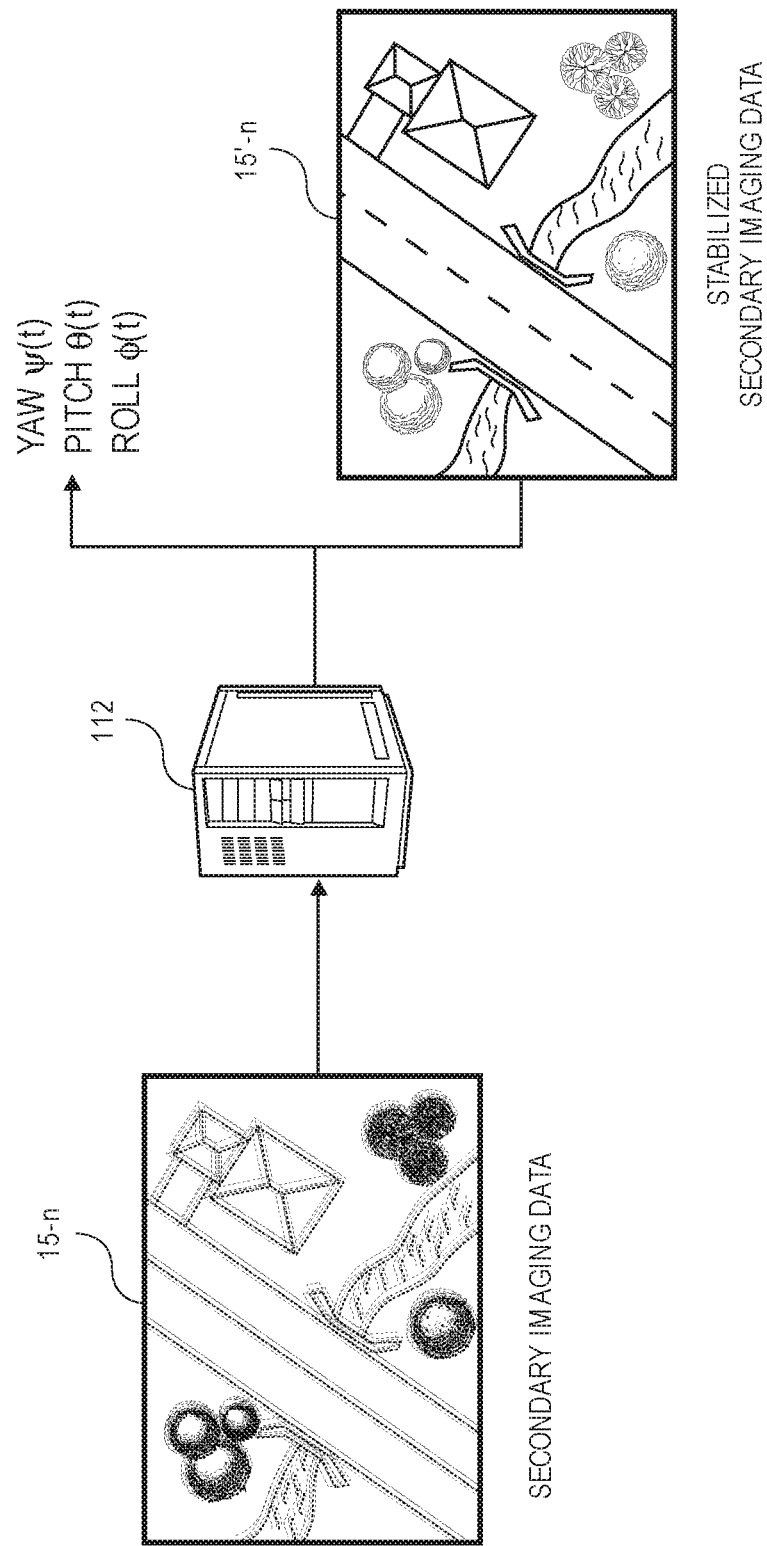

As is shown in FIG. 1D, the secondary imaging data 15-$n$ captured using the secondary imaging device 150 may be provided to a computing device 112 (e.g., a server or other computing device or machine having one or more processors operating thereon) for processing according to one or more image stabilization techniques. The computing device 112 may be provided aboard the aerial vehicle 110, in an external physical location, or in one or more alternate or virtual locations, e.g., in a "cloud"-based environment. As is also shown in FIG. 1D, in an unmodified state, a stream of the secondary imaging data 15-$n$ appears blurry, as each of the substantially sharp secondary images 15-1, 15-2, 15-3, 15-4 is misaligned with respect to one another on account of motion of the aerial vehicle 110 as each of the secondary images 15-1, 15-2, 15-3, 15-4 was captured. The computing device 112 may process the secondary imaging data 15-$n$ according to one or more electronic image stabilization techniques. For example, the computing device 112 may recognize one or more reference points within one or more of the secondary images 15-1, 15-2, 15-3, 15-4, and utilize the presence of such reference or anchor points within the secondary images 15-1, 15-2, 15-3, 15-4 to stabilize or align one or more such reference points or anchor points with respect to one another. Because the secondary imaging device 150 is aligned in a downward direction, the secondary imaging device 150 may be reasonably expected to include ground terrain within a field of view during all or most of the in-flight operations of the aerial vehicle 110. Any of a number of reference points or anchor points on the ground terrain within the secondary imaging data 15 may be identified and used to determine or predict the motion of the secondary imaging device 150 and to define a stabilized set 15'-$n$ of the secondary imaging data 15-$n$, e.g., such that the respective secondary images 15-1, 15-2, 15-3, 15-4 are properly aligned with respect to one another. Once the motion of the secondary imaging device 150 has been determined or predicted, each of the substantially sharp images 15-1, 15-2, 15-3, 15-4, may be properly aligned with respect to one another by the computing device 112, based on the determined or predicted motion, such that a stream of the stabilized secondary imaging data 15'-$n$ appears clear.

As is also shown in FIG. 1D, the computing device 112 may determine or predict one or more aspects of the motion of the secondary imaging device 150, including but not limited to functions or vectors relating to yaw of the secondary imaging device 150, or $\psi(t)$; pitch of the secondary imaging device 150, or $\theta(t)$; or roll of the secondary imaging device 150, or $\phi(t)$, over time. As is noted above, because the secondary imaging device 150 is joined to the primary imaging device 140, determinations or predictions of motion of the secondary imaging device 150 may be presumed to correspond to motion of the primary imaging device 140, as well.

Figure 1E:
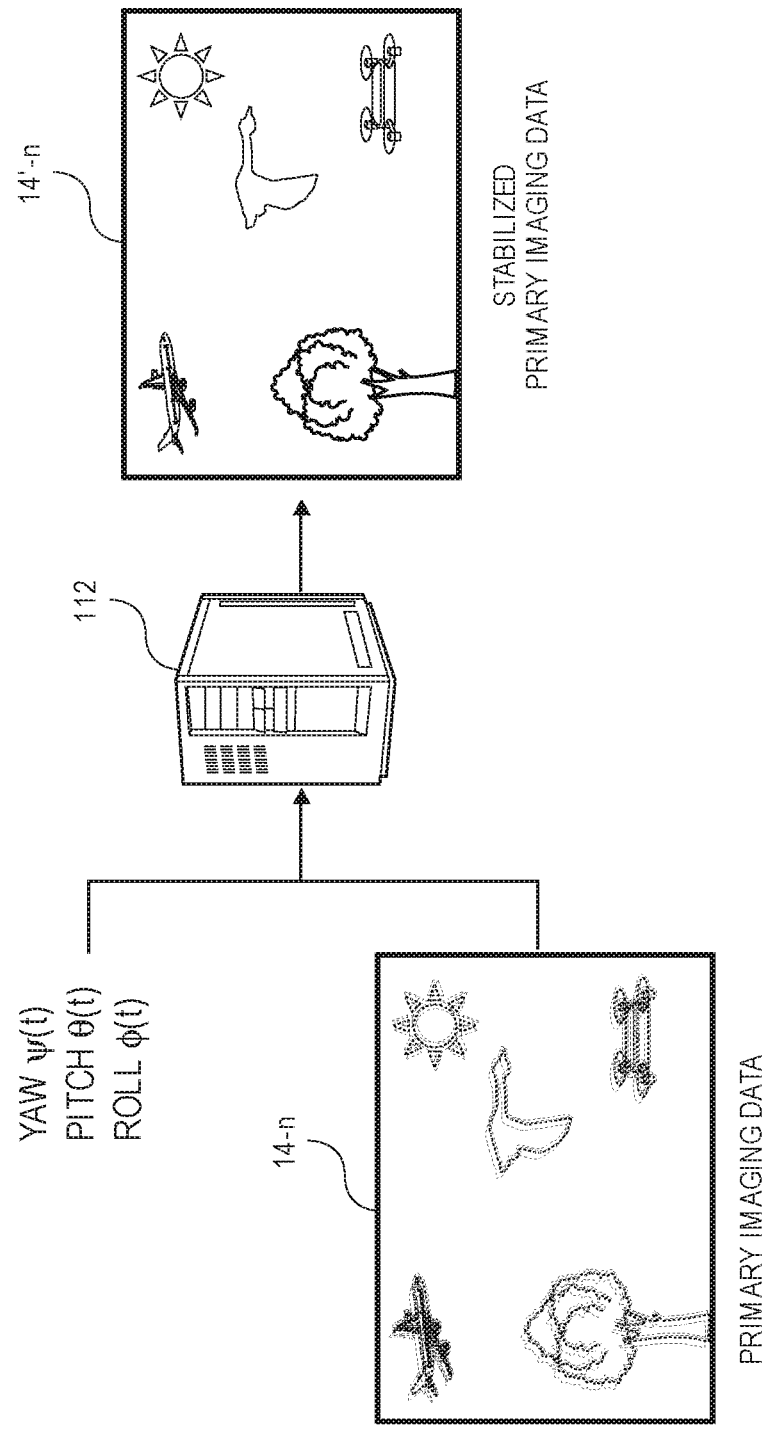

Subsequently, determined or predicted aspects of motion of the secondary imaging device 150 and, therefore, motion of the primary imaging device 140, may be used to stabilize imaging data that is previously, concurrently or subsequently captured using the primary imaging device 140. As is shown in FIG. 1E, the functions or vectors corresponding to the yaw $\psi(t)$, the pitch $\theta(t)$, or the roll $\phi(t)$ of the primary imaging device 140 are provided to the computing device 112 and used to digitally alter the primary imaging data 14-$n$ captured thereby, and to define a stabilized set 14'-$n$ of the primary imaging data 14-$n$ accordingly. Alternatively, the yaw function $\psi(t)$, the pitch function $\theta(t)$, or the roll function $\phi(t)$ could be used to modify the operation of the primary imaging device 140 in real time or in near-real time, such as by modifying the operation or relative positions or orientations of one or more components such as lens modules using one or more electronic motors or gyroscopes, in order to optically stabilize imaging data captured using the primary imaging device 140, e.g., by varying a path of light passing between a lens and an image sensor.

Imaging data in the form of visual imaging data, or depth imaging data, may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), or in one or more removable data stores (e.g., flash memory devices). Alternatively, such data files may be displayed on one or more broadcast or closed-circuit television networks, or over a computer network as the Internet.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Image stabilization is sometimes described as one or more processes for improving image quality by removing the effects of apparent motion of objects within such images, e.g., motion due to vibration, tracking errors, differential refraction in the atmosphere, or any other factors. In most instances, objects expressed in imaging data are either not actually in motion, or are actually in motion that is stable and/or predictable. Image stabilization techniques are intended to generate imaging data having greater sharpness and higher contrast and resolution than imaging data that was originally captured using an imaging device.

Apparent motion may result when any type of imaging data is captured using any type of imaging device. For example, apparent motion may be observed within imaging data as a result of small amounts of camera shaking or motion when such imaging data was captured at slow shutter speeds or using lenses with comparatively long focal lengths. Alternatively, apparent motion may also be observed within imaging data when a camera is vigorously shaken, even for brief periods, and even at high shutter speeds or where cameras feature lenses having comparatively short focal lengths.

Currently, imaging data may be stabilized according to one or more stabilization techniques, including but not limited to image registration or image matching techniques. In digital or electronic image stabilization algorithms may be used to estimate motion vectors associated with reference points, anchor points, edge patterns or other recognizable features appearing within captured imaging data, e.g., a sequence of images captured using an imaging device. For example, in a feature-based image matching technique, a set of substantially prominent anchor points are identified in each image and matched to one another, and a transformation from a first image to a second image (and subsequent images) based on the correspondence of the respective pairs of points may be computed. In an area-based image matching technique, each of the pixels in an image, or a substantial portion of the pixels in the image, is considered by one or more algorithms to evaluate a set of possible transformations between respective images, or a series of images, based on similarity criteria. A highest-scoring or highest-rated transformation is selected accordingly.

By identifying one or more salient features in an image, e.g., reference points, anchor points, edge patterns or other recognizable features, and tracking such salient features in a plurality of images, the salient features may be utilized as anchor points to cancel out all perturbations relative to such salient features. For example, in some digital stabilization techniques, image pixels lying outside of an image border may be used as a buffer for motion, and information regarding such pixels may be used to shift an image from frame to frame, in order to balance out the effects of translation or rotational motion and define a stream of stable video imagery, such as by aligning two or more frames of the same scene that are collected at different time periods or by different sensors and/or from different perspectives. In other digital stabilization techniques, correlations between image signals may be used to stabilize a sequence of images, e.g., by detecting and tracking features within respective images.

In optical image stabilization, motion of an imaging device may be detected and measured using one or more sensors such as gyroscopes or accelerometers (e.g., translational and/or rotational motion, including but not limited to vibration). Readings from such sensors may be provided to electromechanical actuators for manipulating lenses, image sensors or other components within an optical chain, in order to compensate for the detected and measured motion by varying an optical path.

Problems associated with noise, vibration or other adverse effects are particularly acute where imaging devices are mounted to and/or operated in conjunction with operating machinery. For example, when an aerial vehicle is equipped with one or more imaging devices, such as digital cameras, for use during flight operations, such imaging devices are commonly subject to motion caused by noise, vibration, fluid flow, shocks, impacts or other sources. Determining or estimating motion of an imaging device is, therefore, helpful in stabilizing imaging data captured using an imaging device. As is noted above, motion may commonly be determined or estimated based on portions of captured imaging data, e.g., reference points, anchor points, edges or other features within the captured imaging data. Once the motion of the imaging device is determined or estimated, imaging data captured by the imaging device may be digitally stabilized, or the operation of the imaging device may be modified to optically stabilize imaging data subsequently captured thereby.

During operations of an aerial vehicle, imaging devices may be used in a number of mission-critical functions, including but not limited to guidance, control, surveillance, collision avoidance or other applications. However, when an imaging device provided aboard an operating aerial vehicle is aligned in a substantially forward-looking, upward-looking or lateral orientation, a field of view of the imaging device frequently does not include ground-based terrain or any other features that may serve as reference points, anchor points or other reliable visual benchmarks from which motion of the imaging device may be derived, and with which imaging data captured using the imaging device may be stabilized. In this regard, imaging data captured by a mission-critical imaging device typically may not be used to determine motion of the imaging device. Therefore, such imaging data may typically not be used to stabilize itself, or to stabilize images subsequently captured by the imaging device, either by digital or optical stabilization techniques.

The systems and methods of the present disclosure are directed to image stabilization techniques (e.g., image registration, image matching or other techniques) that utilize multiple sensors in order to obtain and stabilize imaging data. In some embodiments, a first imaging device having a lens (or lens module) or other structure may include a second sensor mounted to the lens or structure. Data captured using the second sensor may be processed in order to determine or predict a level of motion (e.g., translational and/or rotational) of the lens or structure of the first imaging device. Subsequently, imaging data captured using the first imaging device may be stabilized based on the determined or predicted level of motion, which may be expressed with respect to one or more functions or vectors. The second sensor may be an imaging device (e.g., not only digital cameras but also range cameras, depth sensors, infrared sensors, ultrasound imaging devices or X-ray imaging devices) that may be oriented to include ground terrain within a field of view, and portions of the ground terrain may be identified and used to estimate motion of the second sensor accordingly. Alternatively, the second sensor may be a gyroscope, an accelerometer, or another like device from which motion of the second sensor and, therefore, motion of the first imaging device may be determined or estimated. Because the second sensor is physically joined to the lens or other structure of the first imaging device, motion of the second sensor may be deemed equivalent to motion of the first imaging device, and may be used to stabilize imaging data captured using the first imaging device by optical or digital stabilization techniques, or in any other manner.

In some embodiments, an aerial vehicle may include a primary imaging device that is dedicated for use in one or more mission-critical functions, such as guidance, control, surveillance, collision avoidance or other functions. A secondary sensor, such as a secondary imaging device, may be mounted to a lens (or lens module) of the primary imaging device. The primary imaging device may be operated in a forward orientation, or in any other relevant orientation, including but not limited to orientations that do not include any ground terrain or ground-based structures within their respective fields of view. The secondary imaging device may be operated in a downward orientation, or in any other relevant orientation, including but not limited to orientations that will regularly or consistently include ground terrain or other ground-based structures within at least a portion of their respective fields of view, or within entireties of their respective fields of view. Thus, imaging data captured by the secondary imaging device may be used to determine or predict a level of motion of lens of the primary imaging device, and the determined or predicted level of motion may be used to stabilize imaging data captured by the primary imaging device, e.g., by optical or digital stabilization techniques.

In some embodiments, a primary imaging device may be a high-quality, high-resolution digital camera provided for performing one or more mission-critical functions, such as guidance, control, surveillance, collision avoidance or other applications. In some embodiments, a lens (or lens module) or other optical element of the primary imaging device may be outfitted or otherwise associated with one or more secondary imaging devices that are similar in size and/or quality to digital cameras that are commonly provided within laptop computers, tablet computers, smartphones or other mobile devices, including but not limited to autofocusing cameras having any number (e.g., eight to forty-eight megapixels) or size of pixel sensors (e.g., approximately one micron), any relative apertures or focal lengths, or any numbers of lenses, filters, or other components that are configured to capture still or moving images and any associated audio signals or metadata (e.g., geotags or date or time stamps). The one or more secondary imaging devices may be joined to the lens or optical element of the primary imaging devices in any manner, such as by adhering or affixing the secondary imaging devices to the lens or optical element, embedding the secondary imaging devices within a surface of the lens or optical element, or in any other manner.

In some embodiments, a primary imaging device may be configured to capture images at a first frame rate that may be selected based at least in part on one or more applications for which the primary imaging device is provided, and within or subject to one or more operational constraints of the primary imaging device. One or more secondary imaging devices may be joined to an external surface of a lens or lens module of the primary imaging device, and configured to capture images at a second frame rate that may be selected based at least in part on a desired level of accuracy or precision of functions, vectors or other metrics representative of translational and/or rotational motion of the primary imaging device. For example, the second frame rate may be substantially higher than the first frame rate, in order to optimize the accuracy or precision of the functions, vectors or metrics of motion determined thereby.

Figure 2:
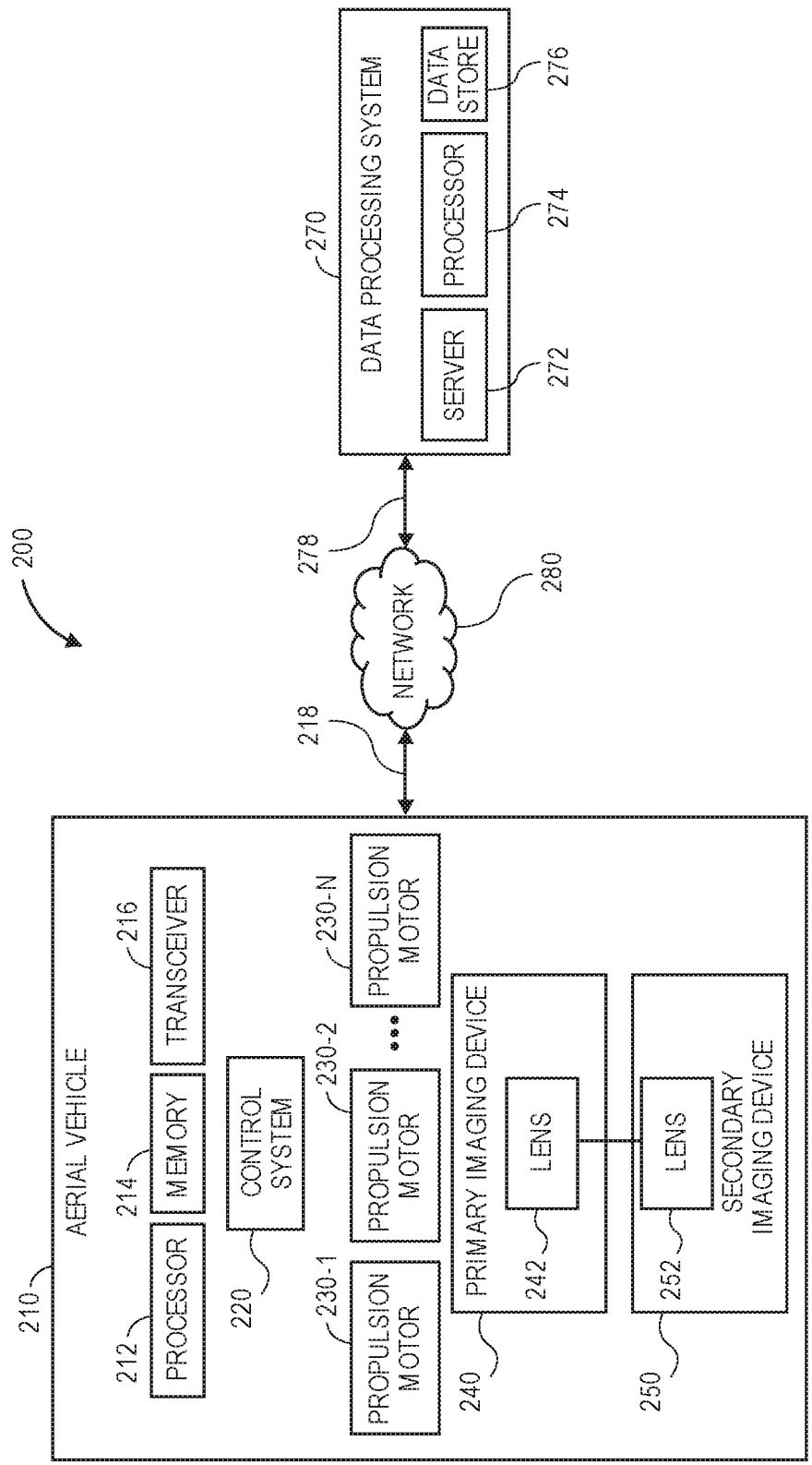
FIG. 2 is a block diagram of one system for performing multi-sensor image stabilization techniques in accordance with embodiments of the present disclosure.

Referring to FIG. 2, a block diagram of components of one system 200 for performing multi-sensor image stabilization techniques in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1E.

The aerial vehicle 210 includes a processor 212, a memory 214 and a transceiver 216, a control system 220, a plurality of propulsion motors 230-1, 230-2 . . . 230-n, a primary imaging device 240 and a secondary imaging device 250.

The processor 212 may be configured to perform any type or form of computing function, including but not limited to the execution of one or more image processing algorithms or techniques. For example, the processor 212 may control any aspects of the operation of the aerial vehicle 210 and the one or more computer-based components thereon, including but not limited to the control system 220, the propulsion motors 230-1, 230-2 . . . 230-n, the primary imaging device 240 or the secondary imaging device 250. For example, the processor 212 may control the operation of the control system 220 for generating instructions for conducting operations of components of the aerial vehicle 210, e.g., for operating one or more of the propulsion motors 230-1, 230-2 . . . 230-n, or any other aspect of the aerial vehicle 210, including but not limited to control surfaces, lights or payload manipulation equipment provided thereon (not shown). The control system 220 may be associated with the processor 212 and/or with one or more other computing devices or machines (not shown) over the network 280, and may communicate with the data processing system 270 or the one or more other computer devices or machines (not shown) over the network 280, through the sending and receiving of digital data. The aerial vehicle 210 further includes one or more memory or storage components 214 (such as databases or data stores) for storing any type of information or data, e.g., instructions for operating the aerial vehicle 210, or information or data captured during operations of the aerial vehicle 210.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The processor 212 may be provided as a portion of, or may be further configured to operate, one or more other systems such as electronic speed controls, power supplies, navigation systems and/or payload engagement controllers for engaging with or releasing items, as desired. For example, the processor 212 may be configured to cause or control the operation of one or more of the propulsion motors 230-1, 230-2 . . . 230-n, the primary imaging device 240 or the secondary imaging device 250, such as by causing one or more of the propulsion motors 230-1, 230-2 . . . 230-n to operate at a desired speed, in order to guide the aerial vehicle 210 along a determined or desired flight path, by causing the primary imaging device 240 or the secondary imaging device 250 to capture imaging data, or by operating one or more control surfaces, lights, payload manipulation equipment, or any other component provided thereon.

Additionally, the memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

The propulsion motors 230-1, 230-2 . . . 230-n may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the propulsion motors 230-1, 230-2 . . . 230-n may be a brushless direct current (DC) motor such as an outrunner brushless motor or an inrunner brushless motor. The aerial vehicle 210 may include any number of such propulsion motors 230-1, 230-2 . . . 230-n of any kind. For example, one or more of the propulsion motors 230-1, 230-2 . . . 230-n may be aligned or configured to provide forces of lift to the aerial vehicle 210, exclusively, while one or more of the propulsion motors 230-1, 230-2 . . . 230-n may be aligned or configured to provide forces of thrust to the aerial vehicle 210, exclusively. Alternatively, one or more of the propulsion motors 230-1, 230-2 . . . 230-n may be aligned or configured to provide forces of lift and forces of thrust to the aerial vehicle 210, as needed. For example, the propulsion motors 230-1, 230-2 . . . 230-n may be fixed in their orientation on the aerial vehicle 210, or configured to vary their respective orientations, e.g., a tilt-rotor aircraft. Moreover, the propulsion motors 230-1, 230-2 . . . 230-n may be aligned or configured to operate with different capacities or ratings, or at different speeds, or coupled to propellers having different sizes and shapes.

The primary imaging device 240 and the secondary imaging device 250 may be any form of optical recording devices that may be used to photograph or otherwise record imaging data of structures, facilities, terrain or any other elements encountered during operation of the aerial vehicle 210, or for any other purpose. As is shown in FIG. 2, the primary imaging device 240 includes a lens (or lens module) 242, and the secondary imaging device 250 includes a lens 252. As is discussed above, the secondary imaging device 250 is mounted or physically joined to the lens 242 of the primary imaging device 240, in any alignment or orientation (e.g., with the primary imaging device 240 aligned in a substantially forward orientation and with the secondary imaging device 250 aligned in a substantially downward orientation), such that any translational and/or rotational motion of the lens 242 may be deemed substantially equivalent to translational and/or rotational motion of the secondary imaging device 250.

In addition to the lens 242 and the lens 252, the primary imaging device 240 and/or the secondary imaging device 250 may further include one or more sensors, memory or storage components or processors, and such sensors, memory or storage components or processors may further include one or more photosensitive surfaces, filters, chips, electrodes, clocks, boards, timers or any other relevant features (not shown). The primary imaging device 240 and/or the secondary imaging device 250 may capture imaging data in the form of one or more still or moving images of any kind or form, as well as any relevant audio signals or other information, during operation of the aerial vehicle 210, and may be coupled to the processor 212, the memory 214 and/or the transceiver 216 or with one another by way of a wired or wireless connection that may be dedicated or comprise all or part of an internal network (not shown), and/or adapted or otherwise configured to communicate with the data processing system 270, or with one or more other computer devices by way of the network 280. Although the aerial vehicle 210 of FIG. 2 includes a single box corresponding to one primary imaging device 240 and a single box corresponding to one secondary imaging device 250, those of ordinary skill in the pertinent arts will recognize that any number or type of primary imaging devices or secondary imaging devices may be provided in accordance with the present disclosure, including but not limited to digital cameras, depth sensors or range cameras, infrared cameras, radiographic cameras or other optical sensors.

In addition to the primary imaging device 240 and the secondary imaging device 250, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 270 includes one or more physical computer servers 272 having a plurality of databases 274 associated therewith, as well as one or more computer processors 276 provided for any specific or general purpose. For example, the data processing system 270 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 272 may be connected to or otherwise communicate with the databases 274 and the processors 276. The databases 274 may store any type of information or data, including but not limited to acoustic signals, information or data relating to imaging data, or information or data regarding environmental conditions, operational characteristics, or positions, for any purpose. The servers 272 and/or the computer processors 276 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 276, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but are not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
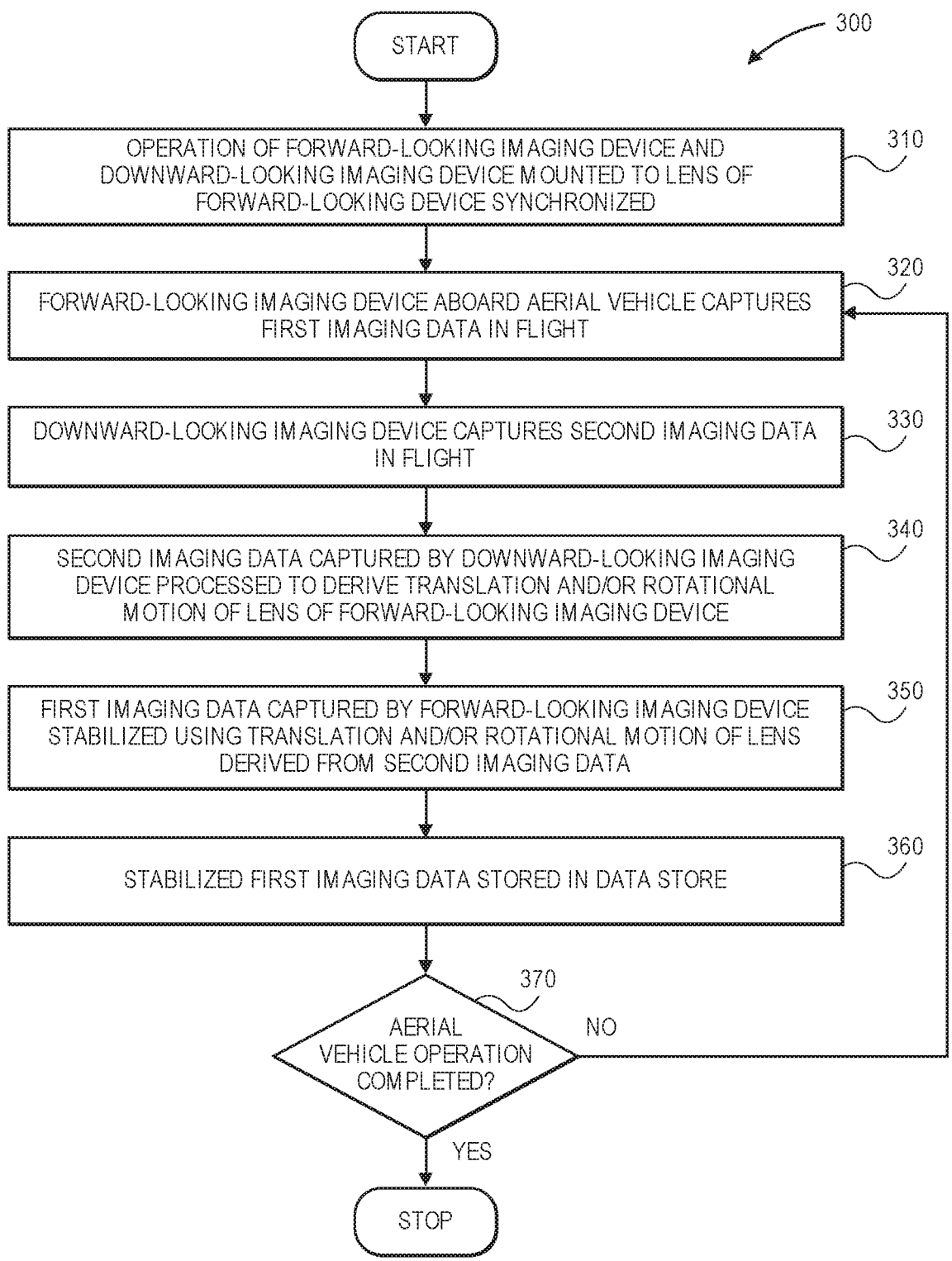
FIG. 3 is a flow chart of one process for multi-sensor image stabilization in accordance with embodiments of the present disclosure.

As is discussed above, in accordance with embodiments of the present disclosure, imaging data captured by a first imaging device having a lens (or lens module) or other optical element that is operating aboard an aerial vehicle may be processed and stabilized using imaging data captured by a second imaging device that is joined to the lens or other optical element of the first imaging device. Referring to FIG. 3, a flow chart 300 of one process for multi-sensor image stabilization in accordance with embodiments of the present disclosure is shown. At box 310, operations of a forward-looking imaging device provided aboard an aerial vehicle and a downward-looking aerial vehicle mounted to a lens of the forward-looking imaging device are synchronized while the aerial vehicle is in flight. For example, the downward-looking imaging device may be a substantially smaller imaging device than the forward-looking imaging device, and may be mounted to an underside of the lens of the forward-looking imaging device, such that the downward-looking imaging device preferably maintains ground terrain or other fixed features within at least a portion of its field of view during operations of both the forward-looking imaging device and the downward-looking imaging device. The imaging devices may be configured to time-stamp each of the frames captured thereby, or may begin capturing imaging data at the same time, and at the same frame rate, or at similar frame rates, such as where a frame rate of the forward-looking imaging device is an integer multiple of a frame rate of the downward-looking imaging device, such that a frame is captured by the downward-looking imaging device at the same time as a frame is captured by the forward-looking imaging device.

At box 320, the forward-looking imaging device captures first imaging data while the aerial vehicle is in flight. For example, the forward-looking imaging device may be aligned to capture still or moving images within a field of view that is forward of the aerial vehicle, e.g., to search for objects (such as buildings or other structures, plant life, flying animals or other aerial vehicles) that may represent collision hazards for the aerial vehicle, to identify any markings or waypoints, to perform surveillance or monitoring, or for any other purpose. At box 330, the downward-looking imaging device captures second imaging data while the aerial vehicle is in flight. For example, the downward-looking imaging device may be a substantially smaller imaging device than the forward-looking imaging device, and may be mounted to an underside of a lens module of the forward-looking imaging device, such that the downward-looking imaging device preferably maintains ground terrain or other fixed features within at least a portion of its field of view during operations of both the forward-looking imaging device and the downward-looking imaging device.

At box 340, the second imaging data captured by the downward-looking imaging device is processed to derive translational and/or rotational motion of the lens of the forward-looking imaging device to which the downward-looking imaging device is mounted. For example, the second imaging data may be processed according to one or more algorithms or techniques to derive translational and/or rotational motion of the downward-looking imaging device therefrom, such as by recognizing one or more ground-based reference points, anchor points, edges or other features within the second imaging data, and by tracking motion of such points, edges or other features within a series of frames of the second imaging data. The motion recognized from the second imaging data may be either translational (e.g., movement along vertical, horizontal and/or lateral axes) or rotational (e.g., yaw, pitch or roll about such axes), or a combination of translational and rotational motion, and may be represented in one or more vectors or functions.

At box 350, using the translational and/or rotational motion of the lens derived from the second imaging data, the first imaging data captured by the forward-looking imaging device is stabilized. For example, using the functions or vectors representative of motion derived from the second imaging data, the frames of the first imaging data may be shifted, from frame to frame, e.g., according to one or more image registration, image matching or other image stabilization techniques, in order to balance out the effects of the translational or rotational motion and define a stream of stable video imagery. Alternatively, functions or vectors of the motion of the lens derived from the second imaging data may be utilized in optical image stabilization techniques, e.g., to manipulate lenses, image sensors or other components within an optical chain of an imaging device, in order to compensate for the motion.

At box 360, the stabilized first imaging data is stored in a data store, e.g., onboard the aerial vehicle, in an external physical location, or in one or more alternate or virtual locations, e.g., in a "cloud"-based environment, from which the stabilized first imaging data may be recalled and used for any purpose. At box 370, whether the aerial vehicle has completed its operations is determined. If the aerial vehicle has not completed its operations, then the process returns to box 320, where the forward-looking imaging device captures first imaging data, the downward-looking imaging device captures second imaging data, and the second imaging data is continuously processed to derive the translational and/or rotational motion of the lens of the forward-looking imaging device is determined based on imaging data captured using the downward-looking imaging device. If the aerial vehicle has completed its operations, then the process ends.

Figure 4:
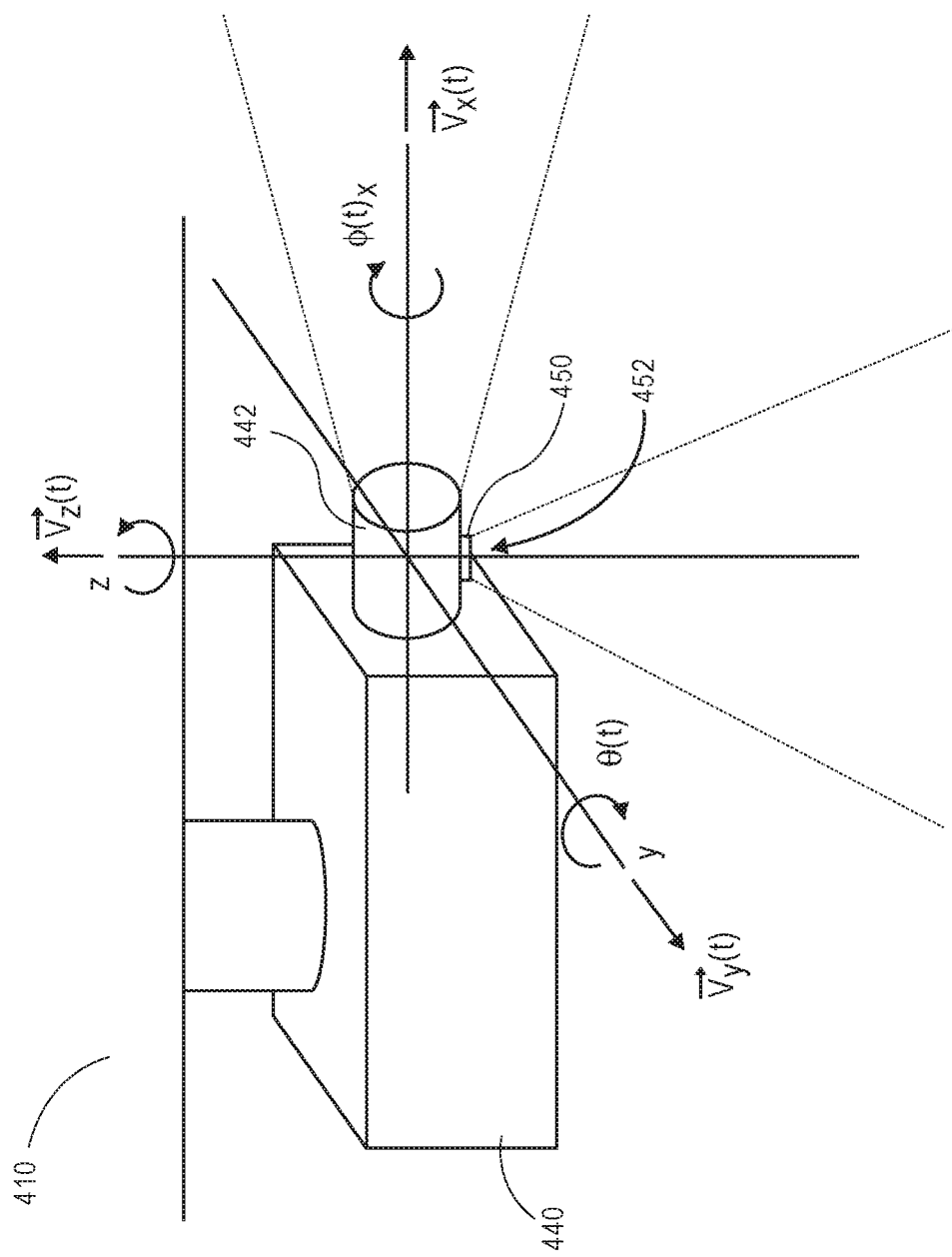
FIG. 4 is a view of aspects of one aerial vehicle configured to perform multi-sensor image stabilization techniques in accordance with embodiments of the present disclosure.

Referring to FIG. 4, portions of an aerial vehicle 410 having a primary imaging device 440 and a secondary imaging device 450 are shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1E.

As is shown in FIG. 4, the primary imaging device 440 includes a lens module 442 and the secondary imaging device 450 includes a lens 452. The secondary imaging device 450 is mounted to an underside of the lens module 442 of the primary imaging device 440, such that fields of view of the primary imaging device 440 and the secondary imaging device 450 are provided in normal or perpendicular alignments with respect to one another. Thus, except in instances in which the aerial vehicle 410 is operated in an inverted alignment, or during periods of extreme rolls or other banked flight, the field of view of the secondary imaging device 450 may be reasonably expected to include ground terrain within all or a portion thereof. Thus, imaging data captured using the secondary imaging device 450 may be processed to determine or predict motion of the secondary imaging device 450 and, therefore, of the primary imaging device 440, along or about one or more axes of orientation.

For example, as is shown in FIG. 4, imaging data captured using the secondary imaging device 450 may be processed to determine or predict velocity functions or vectors $V_x(t)$, $V_y(t)$ or $V_z(t)$ along x, y or z axes, respectively, and translational motion of the secondary imaging device 450 may be expressed using one or more of such functions or vectors. Likewise, imaging data captured using the secondary imaging device 450 may be processed to determine or predict functions or vectors $\psi(t)$, $\theta(t)$ or $\phi(t)$ for corresponding to yaw, pitch or roll of the secondary imaging device 450 about the x, y or z axes, respectively, and rotational motion of the secondary imaging device 450 may be expressed using one or more of such functions or vectors. Once the translational and/or rotational motion of the secondary imaging device 450 is determined or predicted based on imaging data captured by the secondary imaging device 450, such translational and/or rotational motion may be associated with the primary imaging device 440, and used to stabilize imaging data captured by the primary imaging device 440.

As is discussed above, in accordance with embodiments of the present disclosure, motion of a first imaging device may be modeled based on information or data captured by a second sensor (such as another imaging device) that is physically joined to a lens (or lens module) or other optical element of the first mobile device. Because the second sensor is joined to the lens or other optical element of the first imaging device, information or data captured using the second sensor may be used to determine or predict motion of the lens or other optical element of the first imaging device. Using the determined or predicted motion of the lens or other optical element of the first imaging device, imaging data captured by the first imaging device may be stabilized, e.g., according to one or more optical or digital stabilization techniques.

Figure 5:
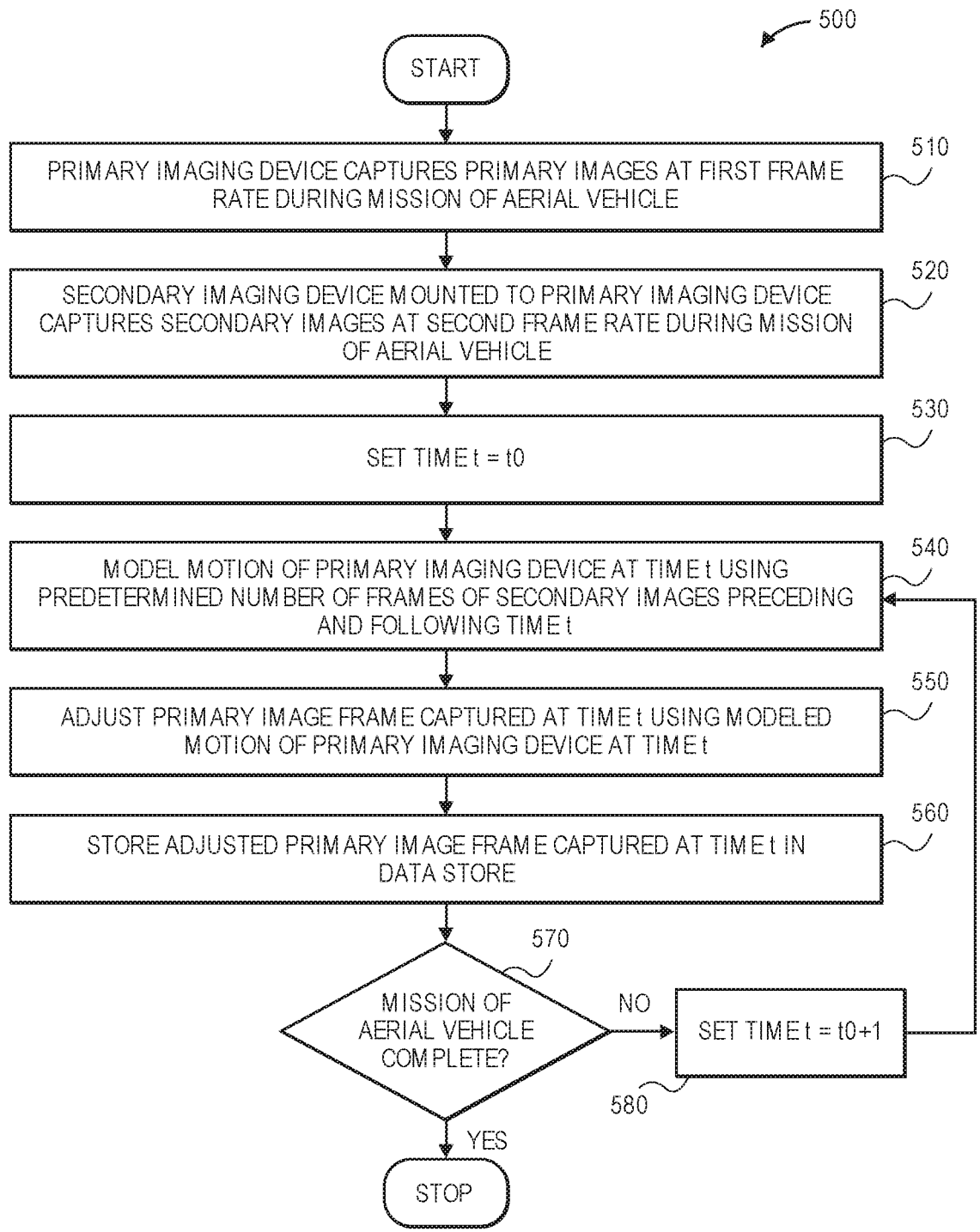
FIG. 5 is a flow chart of one process for multi-sensor image stabilization in accordance with embodiments of the present disclosure.

Referring to FIG. 5, a flow chart 500 of one process for multi-sensor image stabilization in accordance with embodiments of the present disclosure is shown. At box 510, a primary imaging device captures primary images at a first frame rate during a mission of an aerial vehicle. For example, the primary images may be captured for guiding the safe operation of the aerial vehicle, for performing surveillance or monitoring of one or more areas, or for any other purposes. In some embodiments, the primary imaging device may be configured with a substantially forward field of view with respect to a direction of travel of the aerial vehicle, or a standard alignment of the aerial vehicle. In some other embodiments, the primary imaging device may be configured with a field of view aligned in another direction or along another axis.

At box 520, a secondary imaging device mounted to the primary imaging device captures secondary images at a second frame rate during the mission of the aerial vehicle. For example, in some embodiments, the secondary imaging device may be mounted to a lens or other component of the primary imaging device, e.g., to an underside of a lens module. Mounting the secondary imaging device to the lens or other component of the primary imaging device in this manner (e.g., in a substantially downward orientation) will ensure that, in most instances, imaging data captured using the secondary imaging device will include ground terrain within all or most of a field of view of the secondary imaging device. In some embodiments, the secondary imaging device and the primary imaging device may be mounted in normal orientations with respect to one another, resulting in, in some embodiments, a substantially downward orientation for the secondary imaging device and a substantially forward orientation for the primary imaging device. In some embodiments, the second frame rate may equal the first frame rate. In some other embodiments, the second frame rate may be less than the first frame rate. In still other embodiments, the second frame rate may exceed the first frame rate. Alternatively, a second sensor which need not be an imaging device (e.g., a gyroscope or an accelerometer) may be mounted to the primary imaging device and operated to capture information or data at a second rate during the mission of the aerial vehicle with respect to the first frame rate of the primary imaging device; such information or data may also be used to determine or predict the motion of the primary imaging device.

At box 530, an incremental time variable t is set to $t_0$. At box 540, motion of the primary imaging device at time t is modeled using a predetermined number of frames of secondary images preceding and following time t. For example, for a given time, any number of images captured using the secondary imaging device preceding and following time t may be processed to recognize one or more ground-based reference points, anchor points, edges or other features within the images captured using the secondary imaging device. The predetermined number of the images captured using the secondary imaging device may be selected or determined on any basis, including but not limited to frame rates of the primary imaging device or the secondary imaging device, missions or applications in which the aerial vehicle is being utilized, variability in motion of the aerial vehicle, or purposes for which the primary imaging device is being utilized (e.g., guidance, surveillance, collision avoidance or any other purpose).

For example, where comparatively large numbers of frames of secondary images are used to model motion of the primary imaging device, functions or vectors representative of such motion may be smoother or subject to lower levels of variability, and the second frame rate of the secondary imaging device may be selected accordingly. Conversely, where comparatively small numbers of frames of secondary images are used to model motion of the primary imaging device, functions or vectors representative of such motion may identify or represent rapid changes in inflection or other changes in motion. In some embodiments, one, two or three (or more) images captured by the secondary imaging device preceding and following time t may be used to model the motion of the primary imaging device at time t. Alternatively, a single image captured by the secondary imaging device at time t may be used to model the motion of the primary imaging device at time t, e.g., in real time or in near-real time.

At box 550, a primary image frame captured by the primary imaging device at time t is adjusted using the modeled motion of the primary imaging device derived from the secondary imaging data. For example, using functions or vectors of translation or rotational motion derived from the secondary images captured by the secondary imaging device prior to and following time t, imaging data captured by the primary imaging device may be shifted or otherwise adjusted in order to balance out the effects of the motion, thereby resulting in a stable image, or a stream of stable video imagery, captured using the primary imaging device. At box 560, the adjusted primary image frame captured by the primary imaging device at time t may be stored in at least one data store maintained onboard the aerial vehicle, in an external physical location, or in one or more alternate or virtual locations, e.g., in a "cloud"-based environment. The adjusted primary image frame may be recalled and used for any purpose.

At box 570, whether the mission of the aerial vehicle has been completed is determined. The status of the mission may be determined based on a physical location of the aerial vehicle, a status of the aerial vehicle or any payload carried thereby, or any other relevant factor, or upon receiving one or more signals or instructions over a network. If the mission of the aerial is not yet complete, the process advances to box 580, where a value of the incremental time variable t is set to t+1, before returning to box 540. The modeling of the motion of the primary imaging device based on images captured using the secondary imaging device, and the adjustment of images captured using the primary imaging device, may continue continuously until the mission of the aerial vehicle has been completed. If the mission of the aerial vehicle has been completed, however, then the process ends.

Figure 6A:
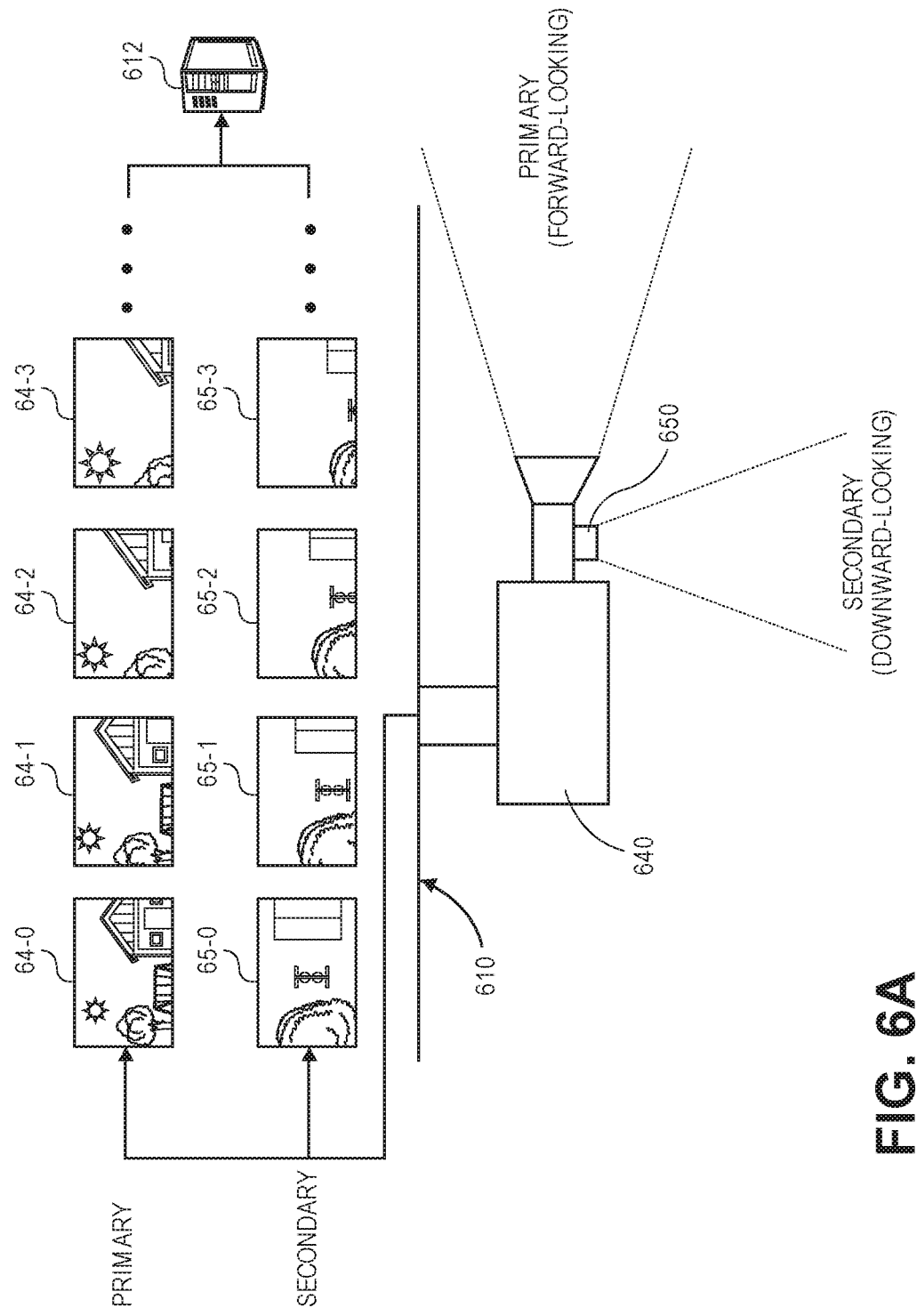
FIGS. 6A through 6B are views of aspects of one aerial vehicle configured to perform multi-sensor image stabilization techniques in accordance with embodiments of the present disclosure.
Figure 6B:
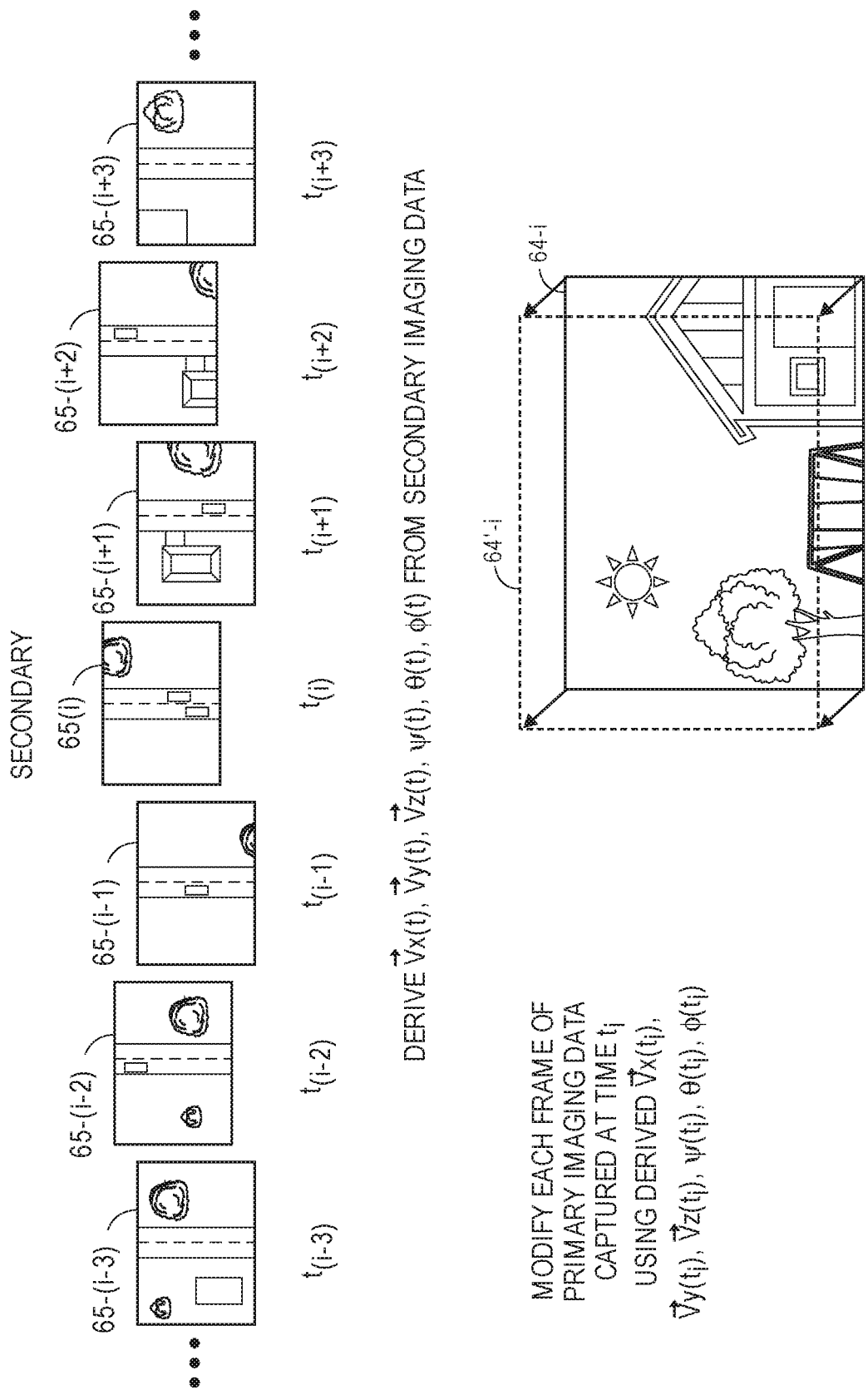

The modeling of motion of a primary imaging device based on information or data captured using a secondary sensor, e.g., a secondary imaging device, mounted to a lens, a lens module or other component of the primary imaging device, according to one embodiment of the present disclosure is shown in FIGS. 6A and 6B. Referring to FIGS. 6A and 6B, views of aspects of one aerial vehicle 610 configured to perform multi-sensor image stabilization techniques in accordance with embodiments of the present disclosure are shown. Except where otherwise noted, reference numerals preceded by the number "6" shown in FIGS. 6A and 6B indicate components or features that are similar to components or features having reference numerals preceded by the number "4" shown in FIG. 4, by the number "2" shown in FIG. 2 or by the number "1" shown in FIGS. 1A through 1E.

As is shown in FIGS. 6A and 6B, the aerial vehicle 610 includes a primary imaging device 640 and a secondary imaging device 650. The secondary imaging device 650 is mounted to an underside of a lens module of the primary imaging device 640. The primary imaging device 640 is aligned to capture a plurality of primary images 64-0, 64-1, 64-2, 64-3, and so on, and to provide such images to a server 612 or other computer device having one or more data stores. The server 612 or other computer device may be provided aboard the aerial vehicle 610, in an external physical location, or in one or more alternate or virtual locations, e.g., in a "cloud"-based environment. The secondary imaging device 650 is also aligned to capture a plurality of secondary images 65-0, 65-1, 65-2, 65-3, and so on, and to provide such images to the server 612 or other computer device. The primary imaging device 640 and the secondary imaging device 650 may be configured to capture images at synchronized, identical frame rates, such that a primary image and a secondary image a captured at the same time, such as is shown in FIG. 6A. Alternatively, the primary imaging device 640 and the secondary imaging device 650 may be configured to capture images at different frame rates. In some embodiments, the secondary imaging device 650 may be configured to capture images at a higher frame rate (e.g., at a faster rate) than the primary imaging device 640. As is also shown in FIG. 6A, the primary imaging device 640 has a field of view aligned in a substantially forward direction, while the secondary imaging device 650 has a field of view aligned in a substantially downward direction. Accordingly, the secondary images 65-0, 65-1, 65-2, 65-3, and others, each include ground-based terrain or other features therein.

As is discussed above, motion of the primary imaging device 640 may be modeled based on information or data (e.g., the plurality of secondary images 65-0, 65-1, 65-2, 65-3, and others) captured using the secondary imaging device 650. For example, a predetermined number of the secondary images 65-0, 65-1, 65-2, 65-3, and others, captured using the secondary imaging device 650 preceding and following a given time may be used to model the motion of the primary imaging device 640 at the given time, and to stabilize imaging data captured using the primary imaging device 640 at the given time accordingly.

As is shown in FIG. 6B, a plurality of secondary images $65\text{-}(i-3)$, $65\text{-}(i-2)$, $65\text{-}(i-1)$, $65\text{-}(i)$, $65\text{-}(i+1)$, $65\text{-}(i+2)$, $65\text{-}(i+3)$ captured at times $t_{(i-3)}$, $t_{(i-2)}$, $t_{(i-1)}$, $t_{(i)}$, $t_{(i+1)}$, $t_{(i+2)}$, $t_{(i+3)}$, respectively, may be used to model the motion of the primary imaging device 640 at time $t_i$, e.g., by deriving a forward velocity function $V_x(t)$, a vertical velocity function $V_y(t)$, a lateral velocity function $V_z(t)$, a yaw function $\psi(t)$, a pitch function $\theta(t)$ and/or a roll function $\phi(t)$ for the primary imaging device 640 as functions of time accordingly. Subsequently, values of the forward velocity function $V_x(t)$, the vertical velocity function $V_y(t)$, the lateral velocity function $V_z(t)$, the yaw function $\psi(t)$, the pitch function $\theta(t)$, or the roll function $\phi(t)$ within the time domain $t_{(i-3)} \leq t \leq t_{(i+3)}$ may be used to modify a primary image 64-$i$ captured at time $t_i$ accordingly. For example, a stabilized primary image 64'-$i$ may be formed from the primary image 64-$i$ captured at time $t_i$ by adjusting a position, alignment or orientation of the primary image 64-$i$ in a manner that accounts for the motion of the aerial vehicle 610, as modeled by the respective functions $V_x(t)$, $V_y(t)$, $V_z(t)$, $\psi(t)$, $\theta(t)$ and/or $\phi(t)$, individually or collectively. A set or series of stabilized primary images may be derived in the same manner, and a stream of such stabilized primary images will appear clear, as each of the stabilized primary images will be properly aligned with respect to one another.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Secondary sensors for capturing information or data from which motion of the secondary sensor may be determined or predicted may be any type of sensor, including not only an imaging device but also a gyroscope, an accelerometer, or any other device for determining or predicting motion. In some embodiments, the secondary sensor may be a secondary imaging device having a lower quality of sensor or image processor, or a lower number of pixels (or pixel rating), a smaller aperture, or a lower level of sharpness than a primary imaging device to which the secondary imaging device is affixed. In some other embodiments, a primary imaging device and a secondary imaging device joined thereto may have the same specifications or levels of quality. Moreover, primary sensors having one or more secondary sensors mounted thereto may be provided anywhere on an aerial vehicle, such as on extensions or appurtenances that are fixed in position or rotation, or on extensions or appurtenances that may be moved or rotated.

Furthermore, in some embodiments, the roles or functions of "primary" sensors and "secondary" sensors may change during operation. For example, where an aerial vehicle having two sensors that are joined to one another is configured to operate in multiple modes, e.g., a vertical flight mode and a horizontal flight mode, a first one of the two sensors may act as a "secondary" sensor and may capture information or data for stabilizing information or data captured by a second of the two sensors, or a "primary" sensor in one flight mode, while the second of the two sensors may act as a "secondary" sensor for capturing information or data for stabilizing information or data captured by the first of the two sensors, or a "primary" sensor, in another flight mode.

As used herein with regard to directions of flight, the terms "forward" or "horizontal" refer to flight in a direction substantially parallel to the ground (i.e., sea level). As used herein with regard to directions of flight, the term "vertical" refers to flight in a direction extending substantially radially outward from a center of the Earth. Those of ordinary skill in the pertinent arts will recognize that flight trajectories may include components of both "forward" or "horizontal" flight vectors and "vertical" flight vectors, and the systems and methods disclosed herein may be operated regardless of the speeds or directions associated with such vectors. Additionally, as used herein with regard to orientations of imaging devices or other sensors, the term "forward" refers to a substantially horizontal orientation of a sensor in a direction of flight when the aerial vehicle is aligned at a substantially zero pitch angle, and the term "downward" refers to a substantially vertical orientation of a sensor toward the Earth when the aerial vehicle is aligned at a substantially zero pitch angle. The fields of view of sensors that are aligned in "forward" or "downward" orientations are not limited to horizontal or vertical angles, however. Moreover, while some of the embodiments of sensors disclosed herein are shown or described as being perpendicular or normal to one another, those of ordinary skill will recognize that two or more sensors may be provided in any alignment with respect to one another, and used to stabilize images or other imaging data captured using one or more of the sensors.

Furthermore, although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
    a frame;
    a primary imaging device joined to the frame, wherein the primary imaging device comprises a primary lens module;
    a secondary imaging device joined to an external surface of the primary lens module, wherein the secondary imaging device comprises a secondary lens module; and
    a control unit having at least one computer processor configured to at least:
        cause a plurality of primary images to be captured by the primary imaging device;
        cause a plurality of secondary images to be captured by the secondary imaging device;
        detect motion of the secondary imaging device based at least in part on at least two of the secondary images; and
        stabilize at least one of the primary images based at least in part on the motion of the secondary imaging device.

2. The aerial vehicle of claim 1, wherein the at least one computer processor is further configured to at least:
    identify a salient feature in a first one of the secondary images; and
    identify the salient feature in a second one of the secondary images,
    wherein the motion of the secondary imaging device is detected based at least in part on the salient feature in the first one of the secondary images and the salient feature in the second one of the secondary images.

3. The aerial vehicle of claim 1, wherein the at least one computer processor is further configured to at least:
derive a model of the motion of the secondary imaging device based at least in part on at least some of the plurality of secondary images,
wherein the at least one vector is defined based at least in part on the model.

4. The aerial vehicle of claim 1, wherein an angular orientation of a lens of the primary lens module is oriented perpendicular to an angular orientation of a lens of the secondary lens module.

5. The aerial vehicle of claim 1, wherein the primary imaging device is configured to capture images at a first level of resolution,
wherein the secondary imaging device is configured to capture images at a second level of resolution, and
wherein the first level of resolution is greater than the second level of resolution.

6. A method comprising:
capturing, by a first sensor, first data during an operation of an aerial vehicle, wherein the first sensor comprises a first imaging device having a first lens module, wherein the first data comprises a first plurality of images, and wherein the first sensor is mounted to the aerial vehicle;
capturing, by a second sensor, second data during the operation of the aerial vehicle, wherein the second sensor comprises a second imaging device having a second lens module, wherein the second imaging device is joined to an external surface of the first imaging device, and wherein the second data comprises a second plurality of images captured by the second imaging device;
determining, by at least one computer processor, motion of the first sensor based at least in part on the second data, wherein the motion of the first sensor is determined based at least in part on at least two of the second plurality of images;
modifying, by the at least one computer processor, a first image of the first plurality of images based at least in part on the motion of the first sensor; and
storing the modified first image in at least one data store.

7. The method of claim 6, wherein the at least two of the second plurality of images comprises a second image and a third image, and
wherein modifying the first image comprises:
identifying a salient feature within the second image;
identifying the salient feature within the third image;
computing a transformation from the second image to the third image; and
modifying the first image or the second image based at least in part on the transformation.

8. The method of claim 6, wherein an angular orientation of the first lens module is perpendicular to an angular orientation of the second lens module.

9. The method of claim 8, wherein the angular orientation of the first lens module is aligned along or parallel to a yaw axis of the aerial vehicle, and
wherein the angular orientation of the second lens module is aligned along or parallel to a roll axis of the aerial vehicle.

10. The method of claim 6, wherein the first image was captured at a first time,
wherein the at least two of the second plurality of images comprises a second image captured prior to the first time and a third image captured after the first time, and
wherein modifying the first image comprises:
determining a first vector based at least in part on the second image and the third image; and
stabilizing the first image based at least in part on the first vector.

11. The method of claim 10, wherein the third image was captured prior to a second time,
wherein the at least two of the second plurality of images comprises a fourth image captured after the second time,
wherein the first plurality of images comprises a fifth image captured at the second time, and
wherein the method further comprises:
determining a second vector based at least in part on the third image and the fourth image; and
stabilizing the fifth image based at least in part on the second vector.

12. The method of claim 6, further comprising:
repositioning the first lens module based at least in part on the motion of the first sensor; and
after repositioning the first lens module,
capturing, by the first sensor, third data during the operation of the aerial vehicle,
wherein the third data comprises a second plurality of images.

13. The method of claim 6, wherein determining the motion of the first sensor comprises:
determining at least one of a forward velocity, a vertical velocity or a lateral velocity of the first sensor based at least in part on the second data.

14. The method of claim 6, wherein determining the motion of the first sensor comprises:
determining at least one of a yaw function, a pitch function or a roll function of the first sensor based at least in part on the second data.

15. The method of claim 6, wherein the first imaging device is configured to capture imaging data at a first level of resolution,
wherein the second sensor is a second imaging device configured to capture imaging data at a second level of resolution, and
wherein the first level of resolution is greater than the second level of resolution.

16. The method of claim 6, wherein the external surface of the first imaging device is an external surface of the first lens module of the first imaging device, and
wherein the second sensor further comprises at least one of a gyroscope or an accelerometer mounted to the first lens module of the first imaging device.

17. An imaging device coupled to an aerial vehicle, wherein the imaging device:
a first lens module, wherein the first lens module has an angular orientation aligned along or parallel to a yaw axis of the aerial vehicle;
a second lens module joined to the first lens module, wherein the second lens module has an angular orientation aligned along or parallel to a roll axis of the aerial vehicle;
a data store; and
at least one computer processor configured to at least:
capture a first plurality of images using the first lens module;
modeling motion of the second lens module based at least in part on at least the first plurality of images;

capture a second plurality of images using the second lens module;

stabilize a first image of the second plurality of images with respect to a second image of the second plurality of images based at least in part on the motion of the second lens module; and store a stream of the second plurality of images in the data store, wherein the stream of images comprises the stabilized first image of the second plurality of images and the second image of the second plurality of images.

18. The imaging device of claim 17, wherein modeling the motion of the second lens module based at least in part on the first plurality of images comprises:

identifying a salient feature within a first image of the first plurality of images;

identifying the salient feature within a second image of the first plurality of images;

computing a transformation from the second image of the first plurality of images to the first image of the first plurality of images; and modeling the motion of the second lens module based at least in part on the transformation.

19. The imaging device of claim 17, wherein the model represents at least one of:

a forward velocity function;
a vertical velocity function;
a lateral velocity function;
a yaw function;
a pitch function; or
a roll function.

20. The imaging device of claim 17, wherein each of the first plurality of images has a first level of resolution, wherein each of the second plurality of images has a second level of resolution, and wherein the first level of resolution is greater than the second level of resolution.

* * * * *